(12) United States Patent
Jun

(10) Patent No.: US 7,330,329 B2
(45) Date of Patent: Feb. 12, 2008

(54) METHOD AND APPARATUS FOR CONTROLLING UNLOAD STANDBY TIME OF HARD DISK DRIVE

(75) Inventor: Jin-wan Jun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/407,951

(22) Filed: Apr. 21, 2006

(65) Prior Publication Data

US 2007/0002485 A1 Jan. 4, 2007

(30) Foreign Application Priority Data

Jun. 29, 2005 (KR) ...................... 10-2005-0057133

(51) Int. Cl.
*G11B 21/02* (2006.01)
(52) U.S. Cl. ........................................ 360/75
(58) Field of Classification Search ...................... None
See application file for complete search history.

(56) References Cited

U.S. PATENT DOCUMENTS

| | | | | |
|---|---|---|---|---|
| 5,682,273 | A | * | 10/1997 | Hetzler ........................ 360/75 |
| 5,841,752 | A | * | 11/1998 | Ohmori et al. ............. 720/630 |
| 6,134,069 | A | | 10/2000 | Catalano et al. |
| 6,441,987 | B1 | * | 8/2002 | Lee .......................... 360/78.04 |
| 7,075,744 | B2 | * | 7/2006 | Cumpson et al. ........ 360/73.03 |
| 2002/0097516 | A1 | | 7/2002 | Gan et al. ..................... 360/75 |

FOREIGN PATENT DOCUMENTS

| | | |
|---|---|---|
| EP | 1566797 | 8/2005 |
| GB | 2411269 | 8/2005 |
| JP | 08-235761 | 9/1996 |
| JP | 2001-283503 | 10/2001 |
| JP | 2002-157813 | 5/2002 |
| KR | 10-2005-0045452 | 5/2005 |

* cited by examiner

*Primary Examiner*—K. Wong
(74) *Attorney, Agent, or Firm*—Staas & Halsey LLP

(57) ABSTRACT

A method of controlling unloading of a hard disk drive, and more particularly, a method and an apparatus for controlling an unload standby time of a hard disk drive according to the accumulated number of unloading operations. The method includes: standing by for an unload standby time in an idle state of the hard disk drive; unloading a head and then counting the number of unloading operations to determine an accumulated number of unloading operations performed by the hard disk drive after the standby time is passed; and reallocating the unload standby time according to the accumulated number of unloading operations. A standby time for an unloading operation is adjusted according to the accumulated number of unloading operations in a hard disk drive such that the possibility of damaging data is minimized.

7 Claims, 5 Drawing Sheets

METHOD AND APPARATUS FOR CONTROLLING UNLOAD STANDBY TIME OF HARD DISK DRIVE

CROSS-REFERENCE TO RELATED APPLICATION

This application claims the priority of Korean Patent Application No. 2005-0057133, filed on Jun. 29, 2005, in the Korean Intellectual Property Office, the disclosure of which is incorporated herein by reference.

BACKGROUND OF THE INVENTION

1. Field of the Invention

The present invention relates to controlling unloading of a hard disk drive, and more particularly, to a method and an apparatus for controlling an unload standby time of a hard disk drive according to the accumulated number of unloading operations.

2. Description of Related Art

A hard disk drive (HDD) is a recording device used to store information. In general, information is recorded on concentric tracks in a surface of at least one magnetic recording disk. A disk is mounted on a spindle motor to be rotated, and information is accessed by a reading/recording head mounted on an actuator arm rotated by a voice coil motor (VCM). The VCM is excited by current to rotate an actuator and move a recording head. A reading/recording head senses a magnetic change generated from a disk surface to read information recorded on the disk surface. In order to record data on the track, current is supplied to the recording head. The current generates a magnetic field, and the magnetic field magnetizes the disk surface.

The HDD performs recording/reproducing operations of data in response to a command from a host system.

When the duration of the idle state, that is, a state in which the HDD does not perform a specific operation and is on standby state for receiving the command from the host system, exceeds a predetermined amount of time, a method of unloading (or parking) the head so as to reduce power consumption is known.

FIG. 1 is a flowchart illustrating a conventional unloading control method.

After a command is executed, that is, after an operation requested from the host system is completed, the HDD enters an idle state. At this time, a timer for counting duration of the idle state is initiated in operation S102. The timer is provided to check whether a standby time to perform an unloading operation is passed.

In operation S104, it is checked whether any command from the host computer was received.

If received in operation S104, received commands are executed in operation S106. At this time, the timer is terminated.

If not received in operation S104, it is determined whether the standby time for an unloading operation is passed in operation S108.

If it is determined that the standby time is not passed in operation S108, process returns to operation S102.

If it is determined that the standby time is passed in operation S108, the unloading operation is performed in operation S110.

When the head is unloaded, current is not applied to the VCM while the spindle motor is stopped. Thus, power consumption of the hard disk drive can be minimized. Indeed, it is preferable to unload the head when the idle state is continued more than a predetermined time so as to reduce power consumption, but it is not preferable, taking performance of HDD into consideration, because an amount of time is needed to load the head being unloaded when leaving from the idle state and there is a high possibility of scratching the disk with the head during both unloading and loading operations. As the number of uses increases, performance of the HDD, as well as other devices, decreases little by little over time. If the number of loading/unloading operations of an unloading device of a HDD exceeds a designed number, the possibility of the head colliding with the disk increases, thereby data recorded on the disk is damaged in both loading and unloading operations, becomes higher due to abrasion, elastic deterioration, etc. of mechanical parts.

Since a HDD especially adapted to a mobile device suffers frequent loading/unloading operations, the possibility of damaging data increases further as the number of loading/unloading operations increases.

However, in a conventional method of controlling an unload, when duration of the idle state exceeds a predetermined amount of time, an unloading operation is scheduled to perform unconditionally, and thus the possibility of damaging data according to the unloading device with the designed number of loading/unloading operations is not considered at all.

BRIEF SUMMARY OF THE INVENTION

An aspect of the present invention provides a method of controlling an unload standby time of a hard disk drive according to an accumulated number of unloading operations so that the possibility of damaging data by a loading/unloading operation is reduced.

An aspect of the present invention provides a hard disk drive obtained by the method of controlling an unload standby time.

An aspect of the present invention provides a computer-readable recording medium having recorded thereon a program for executing the method of controlling an unload standby time of a hard disk drive.

According to an aspect of the present invention, there is provided a method of controlling an unload standby time of a hard disk drive, the method including: standing by for an unload standby time in an idle state of the hard disk drive; unloading a head and then counting the number of unloading operations to determine an accumulated number of unloading operations performed by the hard disk drive after the standby time is passed; and reallocating the unload standby time according to the accumulated number of unloading operations.

According to another aspect of the present invention, there is provided a hard disk drive, the hard disk drive including: a host interface receiving a command from a host system connected to the hard disk drive; an unloading device loading/unloading a head; and a controller controlling a loading/unloading operation of the unloading device according to duration of an idle mode that starts by receiving of a command from the host system via the host interface, wherein, if the command is not received from the host system for an unload standby time, the controller controls the unloading device to unload the head, counts the number of unloading operations to determine an accumulated number of unloading operations performed by the hard disk drive and reallocates the unload standby time according to the accumulated number of unloading operations.

According to still another aspect of the present invention, there is provided a computer-readable recording medium having recorded thereon a program for executing the aforementioned method.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Figure 1:
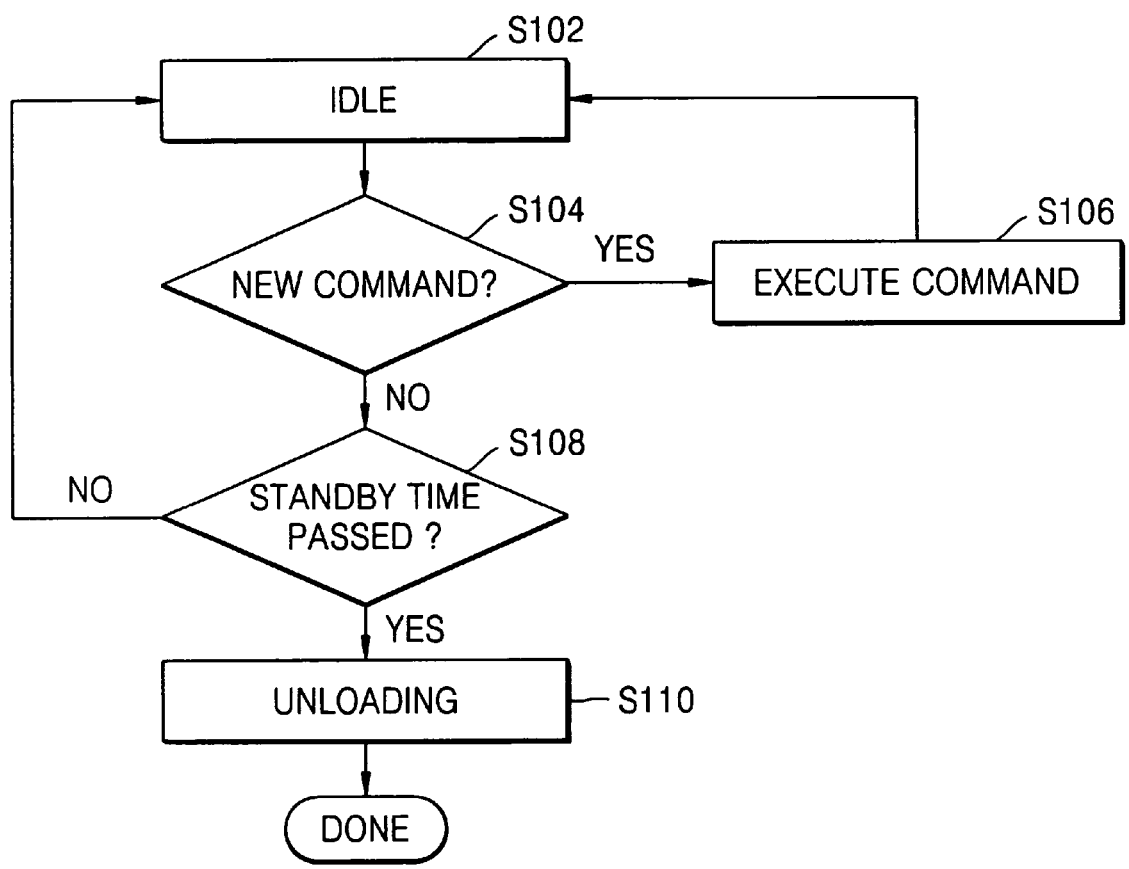
FIG. 1 is a flowchart illustrating a conventional method of controlling unloading of a hard disk drive.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
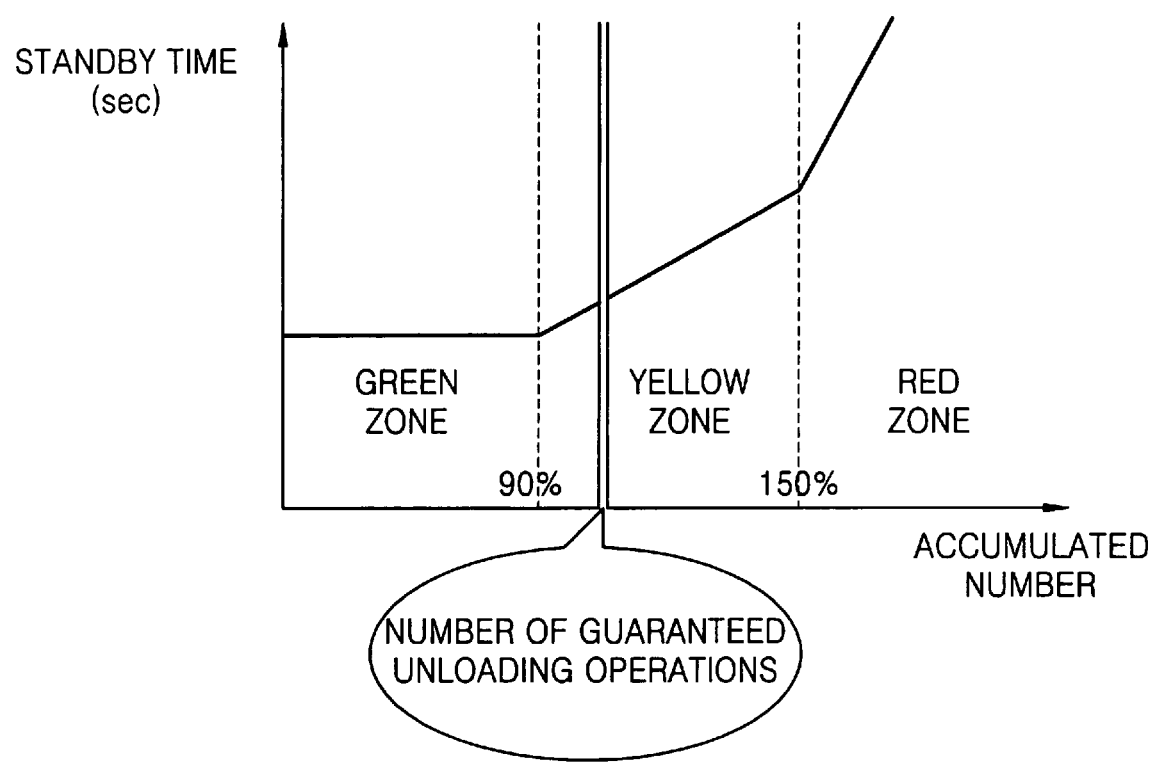
FIG. 2 is a graph for explaining a method of controlling an unload standby time of a hard disk drive according to an embodiment of the present invention.

FIG. 2 is a graph for explaining a method of controlling an unload standby time of a hard disk drive according to an embodiment of the present invention. In FIG. 2, the horizontal axis represents the number of unloading operations, and the vertical axis represents a desired unload standby time. The method of controlling the unload standby time according to an embodiment of the present invention is characterized in that the unload standby time increases as the number of unloading operations increases, as shown in FIG. 2.

In FIG. 2, the number of guaranteed unloading operations represents the number, of which which a safe unloading operation is guaranteed according to design specification of an unloading device. In the method of controlling an unload standby time of a hard disk drive according to an embodiment of the present invention, the unload standby time is differently controlled according to three time zones, for example, a green zone (safe region), a yellow zone (cautious region), and a red zone (dangerous region), which are specified with reference to the number of guaranteed unloading operations. In particular, the green zone may be ranged up to a number a little smaller than, preferably about 90%, the number of guaranteed unloading operations, the yellow zone may be ranged from the end of the green zone to about 150% of the number of guaranteed unloading operations, and the red zone is ranged after the end of the yellow zone.

A predetermined unload standby time is allocated to the green zone while an unload standby time increased according to the number of unloading operations is allocated to the yellow zone and the red zone. In addition, an increment of the standby time with respect to the number of unloading operations in the red zone is larger than that in the yellow zone.

Figure 3:
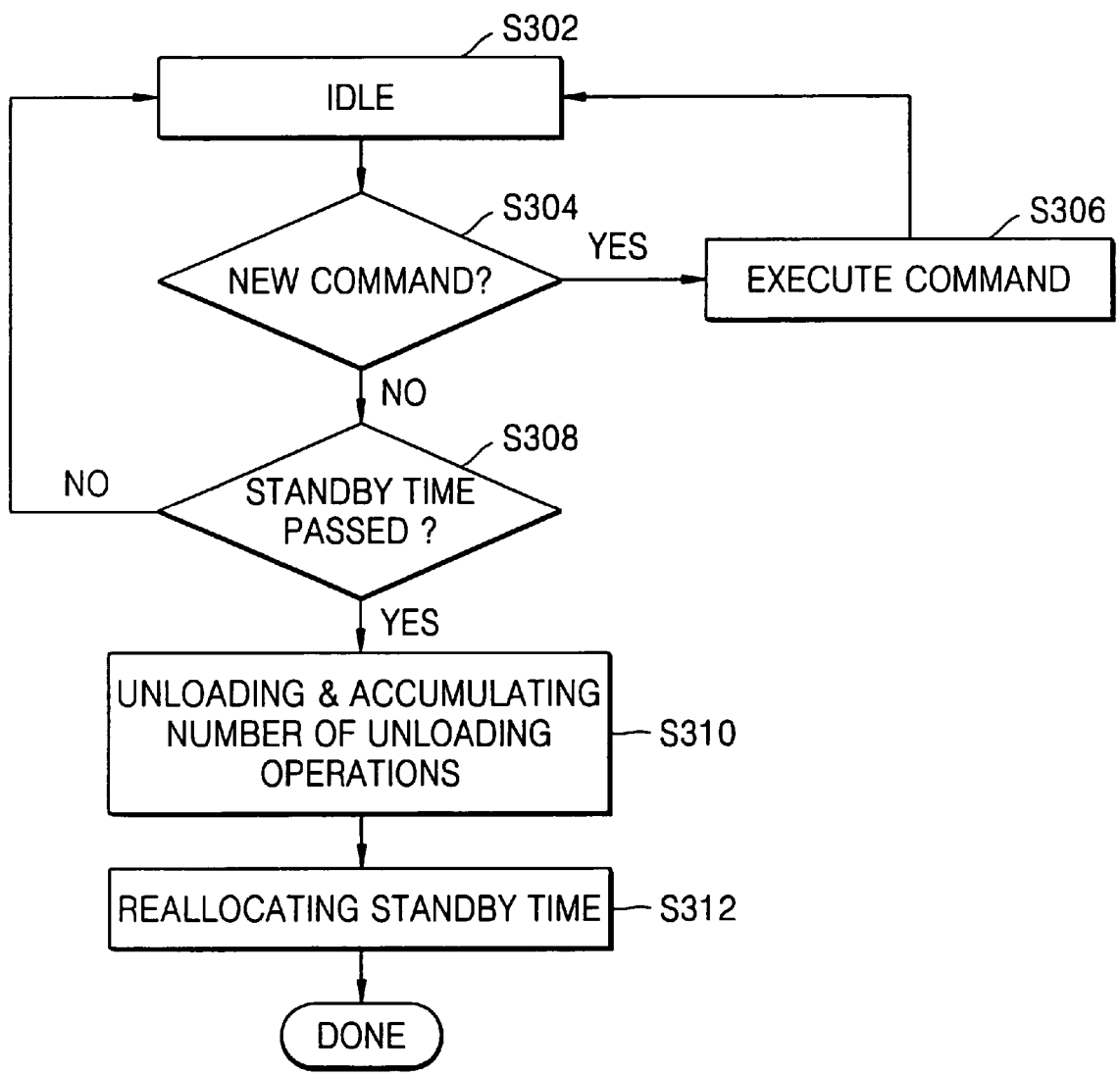
FIG. 3 is a flowchart illustrating the method of controlling an unload standby time of a hard disk drive according to an embodiment of the present invention.

FIG. 3 is a flowchart illustrating the method of controlling an unload standby time of a hard disk drive according to an embodiment of the present invention.

After command is executed, that is, after an operation requested from the host system is completed, the HDD enters an idle state.

At this time, a timer for counting duration of the idle state is initiated in operation S302. The timer is provided to check whether a standby time to perform an unloading operation is passed.

In operation S304, it is checked whether any command from the host computer was received.

If received in operation S304, received commands are executed in operation S106. At this time, the timer is terminated.

If not received in operation S304, it is determined whether the standby time for an unloading operation is passed in operation S308.

If it is determined that the standby time is not passed in operation S308, process returns to operation S302.

If it is determined that the standby time is passed in operation S308, the unloading operation is performed in operation S310.

Here the number of unloading operations is counted and an accumulated number is determined.

In operation S312, an unload standby time is reallocated after the unloading operation is performed. In particular, as shown in FIG. 2, it is determined first to which the unload standby time belongs among the green zone, the yellow zone, and the red zone, by referring to the accumulated number of unloading operations, thereby the unload standby time is reallocated.

In the present embodiment, allocating manner of the unload standby time in the green zone, the yellow zone, and the red zone can be properly and respectively designed according to the performance and purpose of the hard disk drive.

In addition, when the standby time is in either the yellow zone or the red zone, it can be done to scan a data region so as to determine whether data is damaged in a loading operation after an unloading operation. In this case, the number of retry operations can be limited to a predetermined number of times.

Figure 4:
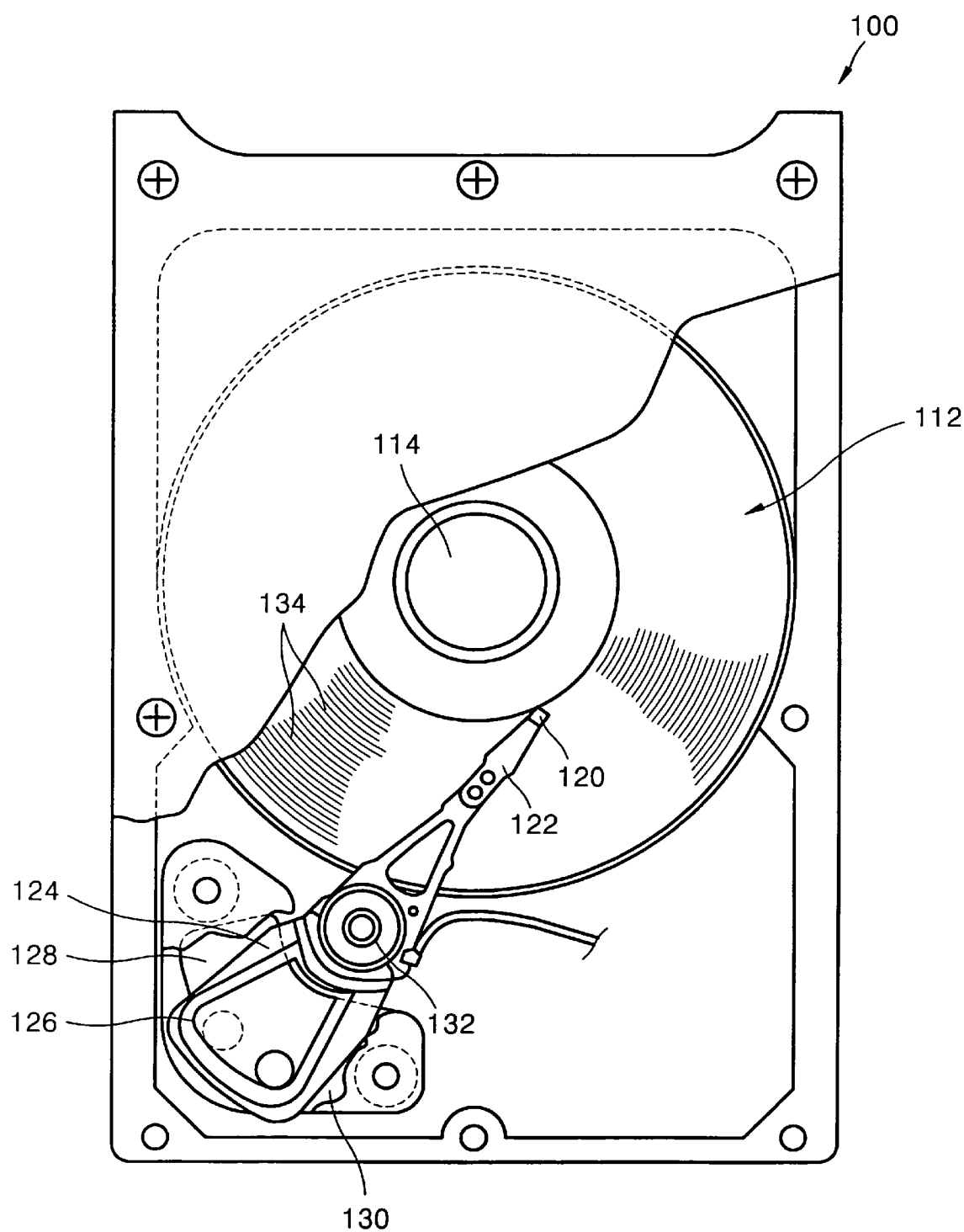
FIG. 4 shows a structure of a hard disk drive 100 where the method of controlling an unload standby time according to an embodiment of the present invention is applied.

FIG. 4 shows a structure of a hard disk drive 100 to which the method of controlling an unload standby time according to an embodiment of the present invention is applicable.

The hard disk drive 100 includes at least one disk 112 rotated by a spindle motor 114. The hard disk drive 100 further includes a head 120 that is adjacent to the surface of the disk 112.

The head 120 can read or record information from or on the disk 112 that rotates, by sensing a magnetic field formed on the surface of the disk 112 or magnetizing the surface of the disk 112. Although a single head 120 is shown in FIG. 1, it will be understood that the head 120 includes a recording head for magnetizing the disk 112 and a separate reading head for sensing the magnetic field of the disk 112.

The head 120 is configured to generate an air bearing between the head 120 and the surface of the disk 112. The head 120 is combined with a head stack assembly (HSA) 122. The HAS 122 is attached to an actuator arm 124 having a voice coil 126. The voice coil 126 is adjacent to a magnetic assembly 128 that defines (supports) a voice coil motor (VCM) 130. Current supplied to the voice coil 126 generates a torque for rotating the actuator arm 124 with respect to a bearing assembly 132. Rotation of the actuator arm 124 may cause the head 120 to move across the surface of the disk 112. To read and/or write data to/from the disk, the head 120 follows tracks 134 on the disk 112.

Information is stored in a ring-shaped track of the disk 112. In general, the disk 112 includes a data zone in which user data is recorded, a parking zone in which the head 120 is placed when the hard disk drive is not used, and a maintenance cylinder. An unload standby time according to the number of unloading operations is stored in the maintenance cylinder.

Figure 5:
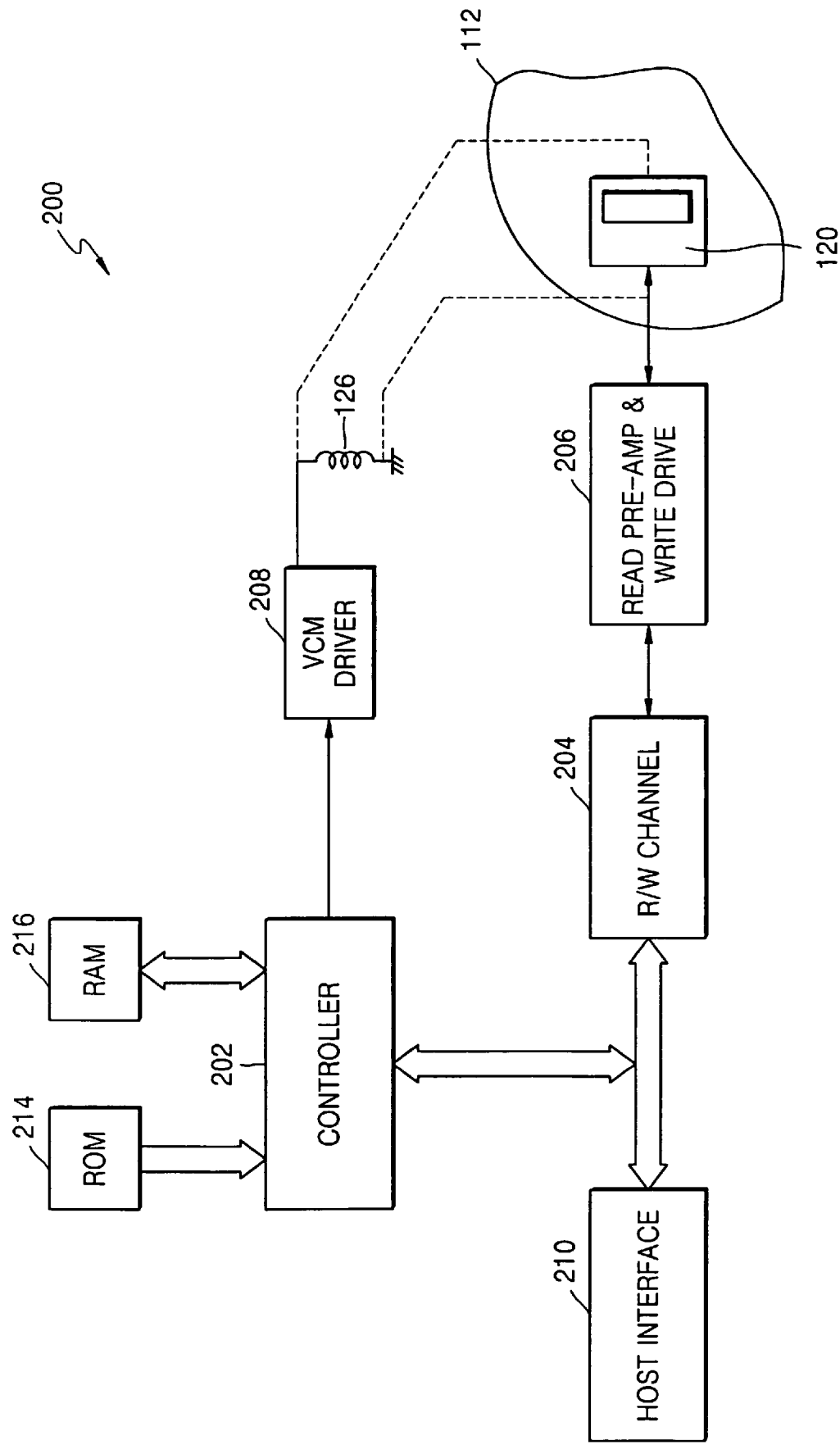
FIG. 5 is a block diagram of an apparatus for controlling the hard disk drive illustrated in FIG. 4 according to an embodiment of the present invention.

FIG. 5 is a block diagram of an apparatus 200 for controlling the hard disk drive illustrated in FIG. 4.

Referring to FIGS. 4 and 5, the apparatus 200 includes a controller 202 combined with the head 120 using a read/write (R/W) channel 204 and a read preamp and write driver 206. The controller 202 may be a digital signal processor (DSP), a microprocessor, a micro-controller, or the like.

The controller 202 supplies a control signal to the R/W channel 204 so as to read or record data from or on the disk 112.

Information is transmitted to a host interface circuit 210 from the R/W channel 204. The host interface 210 includes a controller for interfacing with a system such as a personal computer (PC).

The R/W channel 204 performs signal processing so that, in a play mode, an analog signal read from the head 120 and amplified by the read preamp and write driver 206 is converted into a digital signal that can be read by a host computer (not shown) and outputted to the host interface 210 and user data is received from the host computer via the host interface 210, converted into a recording current so as to be recorded on the disk 112 and the recording current is outputted to the read preamp and write driver 206.

The controller 202 is also combined with a VCM driver 208 for supplying a driving current to the voice coil 126. The controller 202 supplies a control signal to the VCM driver 208 so as to control excitation of the VCM 130 and movement of the head 120.

The controller 202 is combined with read-only memory (ROM) 214 or nonvolatile memory such as flash memory and random access memory (RAM) 216. The memory 214 and 216 include commands and data used by the controller 202 so as to run a software routine.

As one of software routines, a control routine for controlling an unloading operation mode by determining a time length of the idle state and the number of unloading operations is included, as illustrated in FIG. 3.

The controller 202 receives a command from a host system via the host interface 210. The controller 202 interprets the command to control an idle operation mode and the unloading operation mode.

The controller 202 unloads the head 120 when the command is not received from a host system for a predetermined amount of time, that is, when an idle state is maintained for a predetermined amount of time. In this case, a standby time for an unloading operation is determined according to the accumulated number of unloading operations.

The controller 202 accumulates and counts the number of unloading operations whenever the unloading operation is performed, and it resets an unload standby time according to the accumulated number of unloading operations. In particular, the unload standby time in the yellow region and the red region of FIG. 2 increases in proportion to the number of unloading operations.

An example of a hard disk drive has been described in the above-described embodiments of the present invention, but it is to be understood that the present invention is applicable various other drives included, by way of non-limiting examples, an optical disk drive or an optical magnetic disk drive.

Embodiments of the present invention can also be embodied as a method, an apparatus, or a system. When the present invention is embodied using software, the elements of the present invention are code segments that carry out essential operatons. Programs or code segments can be stored in a processor-readable medium or transmitted by a computer data signal combined with carrier waves via a transmission medium or communication network. The processor-readable medium is any data storage device that can store or transmit data which can be thereafter read by a computer system. Examples of the processor-readable medium include electronic circuits, semiconductor memory devices, read-only memory (ROM), flash memory, erasable ROM, floppy disks, optical disks, hard disks, optical fiber medium, radio frequency (RF) network, and the like. The computer data signal is any signal that can be transmitted onto an electronic network channel, optical fiber, air, an electronic field, a RF network, and the like.

In the method and the apparatus for controlling an unload standby time of a hard disk drive according to the above-described embodiments of the present invention, a standby time for an unloading operation is adjusted according to the accumulated number of unloading operations in a hard disk drive such that the possibility of damaging data is minimized.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of controlling an unload standby time of a hard disk drive, the method comprising:
   standing by for an unload standby time in an idle state of the hard disk drive;
   unloading a head and then counting the number of unloading operations to determine an accumulated number of unloading operations performed by the hard disk drive after the standby time is passed; and
   reallocating the unload standby time according to the accumulated number of unloading operations.

2. The method of claim 1, wherein the unload standby time increases as the accumulated number of unloading operations increases.

3. The method of claim 2, wherein the unload standby time is maintained constant up to the number of guaranteed unloading operations guaranteed by design specification of an unloading device, and increases in proportion to the accumulated number of unloading operations after the accumulated number of unloading operations exceeds the number of guaranteed unloading operations.

4. The method of claim 3, further comprising scanning a data region during a load operation after an unloading operation so as to check whether data is damaged after the accumulated number of unloading operations exceeds the number of guaranteed unloading operations.

5. The method of claim 3, wherein the unload standby time is maintained up to the number of guaranteed unloading operations guaranteed by design specifications of an unloading unit, is increased in proportion to the accumulated number of unloading operations if the accumulated number of unloading operations exceeds 90% of the number of guaranteed unloading operations, and is increased at a larger increment when the accumulated number of unloading operations exceeds 150% of the number of guaranteed unloading operations.

6. A hard disk drive comprising:
a host interface receiving a command from a host system connected to the hard disk drive;
an unloading device loading/unloading a head; and
a controller controlling a loading/unloading operation of the unloading device according to duration of an idle mode that starts by receiving of a command from the host system via the host interface,
wherein, when the command is not received from the host system for an unload standby time, the controller controls the unloading device to unload the head, counts the number of unloading operations to determine an accumulated number of unloading operations performed by the hard disk drive and reallocates the unload standby time according to the accumulated number of unloading operations.

7. A computer-readable recording medium having recorded thereon a program for controlling an unloading operation of a hard disk drive, wherein the program controls the hard disk drive according to a process comprising:
receiving a command from a host system for an unload standby time in an idle state of the hard disk drive;
unloading a head, and then counting the number of unloading operations to determine an accumulated number of unloading operations performed by the hard disk drive when the command is not received from the host system for the unload standby time; and
reallocating the unload standby time according to the accumulated number of unloading operations.

* * * * *